(12) United States Patent
Fuchikami et al.

(10) Patent No.: US 8,350,990 B2
(45) Date of Patent: Jan. 8, 2013

(54) LIQUID CRYSTAL DISPLAY APPARATUS

(75) Inventors: Ryuji Fuchikami, Fukuoka (JP); Yoichi Nishida, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 737 days.

(21) Appl. No.: 11/993,374

(22) PCT Filed: Jun. 1, 2006

(86) PCT No.: PCT/JP2006/310981
§ 371 (c)(1),
(2), (4) Date: Apr. 29, 2010

(87) PCT Pub. No.: WO2007/004377
PCT Pub. Date: Jan. 11, 2007

(65) Prior Publication Data
US 2010/0208163 A1    Aug. 19, 2010

(30) Foreign Application Priority Data
Jul. 1, 2005  (JP) .................... 2005-193669

(51) Int. Cl.
*G02F 1/1335*   (2006.01)
*G09F 13/04*   (2006.01)
*H04N 3/08*   (2006.01)

(52) U.S. Cl. ............ 349/67; 349/61; 348/203; 348/771; 348/E13.047; 362/97.2; 362/623

(58) Field of Classification Search .............. 349/62, 349/61, 67; 362/609, 97.2, 623; 348/771, 348/203, E13.047
See application file for complete search history.

(56) References Cited

U.S. PATENT DOCUMENTS

| 6,795,137 | B1 | 9/2004 | Whitted et al. | |
|---|---|---|---|---|
| 7,267,470 | B2 * | 9/2007 | Chang | 362/621 |
| 2003/0214616 | A1 * | 11/2003 | Komoto et al. | 349/96 |
| 2004/0239584 | A1 * | 12/2004 | Edelmann et al. | 345/8 |
| 2005/0140847 | A1 * | 6/2005 | Jeon | 349/62 |

FOREIGN PATENT DOCUMENTS

| JP | 62-87314 | 6/1987 |
|---|---|---|
| JP | 4-100019 | 4/1992 |
| JP | 2001-83510 | 3/2001 |
| JP | 2001-311946 | 11/2001 |
| JP | 2003-131230 | 5/2003 |

OTHER PUBLICATIONS

International Search Report issued Jul. 11, 2006 in the International (PCT) Application No. PCT/JP2006/310981.

* cited by examiner

*Primary Examiner* — Nathanael R Briggs
(74) *Attorney, Agent, or Firm* — Wenderoth Lind & Ponack, L.L.P.

(57) ABSTRACT

A liquid crystal display apparatus includes a light source for emitting light having high directivity; a reflecting plate for reflecting the light emitted by the light source; a liquid crystal layer that the light reflected by the reflecting plate penetrates; a position detector for detecting a position of eyes of a user viewing a display image on the liquid crystal layer to generate position information regarding the position of eyes; a reflection angle controller for controlling a rotation angle of the reflecting plate based on the position information; and a light emission controller for controlling light intensity and a light-emitting angle of the light source according to the rotation angle of the reflecting plate. This configuration enables to effectively radiate the light emitted by the light source toward the eyes of the user.

20 Claims, 11 Drawing Sheets

LIQUID CRYSTAL DISPLAY APPARATUS

BACKGROUND OF THE INVENTION

1. Technical Field

The present invention relates to a liquid crystal display apparatus for displaying an image utilizing reflected light.

2. Background Art

In recent years, information terminal devices represented by cell phones become widely used and obtain higher performance simultaneously. A liquid crystal display apparatus is often provided with these information terminal devices. It is important for these information terminal devices to improve visibility of the liquid crystal display apparatus and to reduce power consumption (especially, for battery-powered information terminal devices).

As a backlight, a light source (e.g. an LED, a cathode-ray tube, or the like) is arranged at the back of a transparent or semi-transparent type of liquid crystal display apparatus, thereby improving visibility thereof. A light source having low directivity is generally used in order to radiate back light within a wide area evenly.

FIG. 11 illustrates a configuration of a conventional liquid crystal display apparatus utilizing a backlight. The conventional liquid crystal display apparatus illustrated in FIG. 11 comprises a light source 2 of the backlight at the back of a liquid crystal device 1. Light from the light source 2 penetrates the liquid crystal device 1, reaches a view area 3, and is visible within a wide area.

In the conventional liquid crystal display apparatus as shown in FIG. 11, it is necessary to use the light source 2 having sufficient luminance in order to make a display content favorably viewable within the wide view area. As a result, the wider the view area 3 is, (in other words, the greater a visual angle of the liquid crystal display apparatus is,) the more power consumption of the light source 2 becomes.

Document 1 (Published Japanese patent application no. 2003-131230) discloses a configuration of a liquid crystal display apparatus, including: a light source means; means for increasing luminance; a liquid crystal display device; a first optical element; and a second optical element. In the liquid crystal display apparatus disclosed in Document 1, the first optical element is provided with a plurality of convex lens corresponding to a plurality of pixels of the liquid crystal display device, and the second optical element is provided with a plurality of concave lens for cancelling refractivity of the first optical element. When used within a narrow visual angle, the first and second optical elements are in close contact with each other, thereby cancelling the refractivity. When used within a wide visual angle, the first and second optical elements are kept at some distance from each other, thereby making use of the refractivity. Document 1 says that the configuration of the liquid crystal display device disclosed therein enables to control the visual angle. The liquid crystal display device disclosed in Document 1, however, does not possess mechanism for dynamically changing setting of a range and a direction of the visual angle. The setting is fixed.

Document 2 (Published Japanese patent application no. 2001-311946) discloses technology of controlling a visual angle of a reflective liquid crystal device. FIG. 12 illustrates a configuration of a conventional reflective liquid crystal device operable to control the visual angle. The reflective liquid crystal device illustrated in FIG. 12 is provided with reflecting plates 4a, 4b, and 4c, each of which reflects extraneous light 5 toward the back of a liquid crystal device 1. The reflecting plates 4a, 4b, and 4c are composed of small mirrors provided for every pixel. The small mirrors are equipped with a reflection angle adjuster and are operable to adjust the angles. The angles of the reflecting plates 4a, 4b, and 4c are adjusted so that reflected light radiates toward a user through this reflective liquid crystal device. Since extraneous light is used as light for display, the reflective liquid crystal device disclosed in Document 2 contributes to low power consumption, however, it is difficult to obtain sufficient luminance within a whole view area. Especially, there is a problem that the device does not work well in a dark place where extraneous light is poor.

As discussed above, it is difficult for conventional liquid crystal display apparatuses to simultaneously realize securing favorable visibility and reducing power consumption.

[Document 1] Published Japanese patent application no. 2003-131230

[Document 2] Published Japanese patent application no. 2001-311946

DISCLOSURE OF INVENTION

In view of the above, an object of the present invention is to provide a liquid crystal display apparatus that simultaneously enables to secure favorable visibility to a user and to reduce power consumption for making a light source emit.

A first aspect of the present invention provides a liquid crystal display apparatus, comprising: a light source operable to emit light having directivity; a reflector operable to reflect the light emitted by the light source; a liquid crystal layer that the light reflected by the reflector penetrates; a position detector operable to detect a position of eyes of a user viewing a display image on the liquid crystal layer to generate first position information regarding the eyes; and a reflection angle controller operable to control a rotation angle of the reflector based on the first position information, thereby adjusting a reflection angle of the light reflected by the reflector.

This configuration enables the liquid crystal display apparatus to dynamically adjust the light reflected by the reflector so as to radiate towards the position of eyes of the user based on the first position information. Accordingly, the liquid crystal display apparatus can always secure favorable visibility to the user and does not need to radiate reflected light toward useless directions unable to be seen by the user, resulting in saving power consumption thereby.

A second aspect of the present invention provides a liquid crystal display apparatus as defined in the first aspect, wherein the reflection angle controller makes the reflection angle of the reflector periodically oscillate within a fixed range based on the first position information.

This configuration enables to periodically oscillate the rotation angle of the reflector within the fixed range. The reflective direction of light reflected by the reflector can be also be periodically oscillated. When a wide view area is needed, for example, in a case where there are a number of users, the liquid crystal display apparatus according to this configuration is effective.

A third aspect of the present invention provides a liquid crystal display apparatus as defined in the first aspect, further comprising: a light emission controller operable to control at least one of light intensity and a light-emitting angle of the light source according to the rotation angle of the reflector.

This configuration enables to adjust both the rotation angle of the reflector and the light-emitting angle of the light source. Reflected light radiated toward useless directions, which is unable to be seen by the user, can be reduced. The light intensity of the light source is also effectively adjusted according to the direction of the reflected light so as to obtain the optimal amount of light.

A fourth aspect of the present invention provides a liquid crystal display apparatus as defined in the third aspect, wherein the light source comprises a plurality of light-emitting elements, and wherein the emission controller adjusts at least one of light intensity and a light-emitting angle of each of the plurality of light-emitting elements based on the first position information.

A fifth aspect of the present invention provides a liquid crystal display apparatus as defined in the fourth aspect, wherein the light emission controller turns on one part of the plurality of light-emitting elements and turns off the other part of the plurality of light-emitting elements based on the first position information.

These configurations enable to provide the display apparatus that can effectively radiate reflected light utilizing the light source with the plurality of light-emitting elements. Based on the first position information, a light-emitting element that is optimal to the user's position is turned on, and the other among the plurality of light-emitting elements is turned off, thereby reducing unnecessary power consumption.

A sixth aspect of the present invention provides a liquid crystal display apparatus as defined in the third aspect, wherein the position detector detects a distance between the user and the liquid crystal layer to generate second position information regarding the detected distance, and wherein the light emission controller adjusts the light intensity of the light source based on the second position information.

Based on the second position information, this configuration reduces the light intensity when the user is near, or increases the light intensity when the user is far. The liquid crystal display apparatus that performs display with always suitable brightness.

A seventh aspect of the present invention provides a liquid crystal display apparatus as defined in the third aspect, wherein the position detector detects positions of eyes of a plurality of users viewing the display screen of the liquid crystal layer to generate third position information regarding the positions of eyes of the plurality of users, wherein the reflect angle controller controls the rotation angle of the reflector based on the third position information, thereby adjusting a reflection angle of light reflected by the reflector, and wherein the light emission controller controls at least one of the light intensity and the light-emitting angle of the light source, thereby making light that has penetrated the liquid crystal layer reach each of the plurality of users.

This configuration enables to radiate the reflected light toward each of the plurality of users based on the third position information. The liquid crystal display apparatus can perform favorable display for every user.

An eighth aspect of the present invention provides a liquid crystal display apparatus as defined in the first aspect, wherein the reflection angle controller makes the rotation angle of the reflector oscillate within a fixed range, wherein the light reflected by the reflector penetrates a part of the liquid crystal layer, the part differing according to the rotation angle of the reflector, and wherein the liquid crystal layer displays display images that differ according to a position and an angle of the user viewing the display images on the liquid crystal layer.

This configuration enables to provide the liquid crystal display apparatus capable of displaying images differing according to the viewing angle of the user. With one liquid crystal display apparatus, for example, a left user and a right user can view images different from each other.

A ninth aspect of the present invention provides a liquid crystal display apparatus as defined in the first aspect, wherein the liquid crystal layer changes the display image synchronizing with the rotation angle of the reflector, thereby displaying display images that differ according to a position and an angle of the user viewing the display images on the liquid crystal layer.

A tenth aspect of the present invention provides a liquid crystal display apparatus as defined in the third aspect, wherein the light source comprises: a plurality of light-emitting elements, wherein the light emission controller turns on one among the plurality of light-emitting elements and turns off the other among the plurality of light-emitting elements, and wherein the liquid crystal layer changes the display image synchronizing with turning on a corresponding light-emitting element of the plurality of light-emitting elements, thereby displaying display images that differ according to a position and an angle of the user viewing the display images on the liquid crystal layer.

These configurations enable to provide the liquid crystal display apparatus capable of displaying images differing according to the viewing position and viewing angle of the user. When a person moves from left to right in front of the liquid crystal display apparatus while watching it, the liquid crystal display apparatus detects his/her position, and can display a display image when he/she is left and display another display image when he/she is right.

An eleventh aspect of the present invention provides a liquid crystal display apparatus as defined in the first aspect, wherein the reflector comprises: a plurality of movable reflectors, and wherein the reflection angle controller controls rotation angles of the plurality of movable reflectors based on the first position information, thereby adjusting reflection angles of light reflected by the plurality of movable reflectors.

This configuration enables to make each rotation angle of the plurality of movable reflector smaller than that of a reflector possessing only one reflection mirror. Accordingly, the liquid crystal display apparatus with rapid response can be provided.

A twelfth aspect of the present invention provides a liquid crystal display apparatus as defined in the eleventh aspect, wherein the light reflected by the plurality of movable reflectors penetrates a part of the liquid crystal layer, the part differing from one to another of the plurality of movable reflectors, and wherein the liquid crystal layer displays a display image that differs according to a position and an angle of the user viewing the display image on the liquid crystal layer.

This configuration earns the same effects as the liquid crystal display apparatus according to the eight aspect of the present invention, that is, the liquid crystal display apparatus with rapid response can be provided.

A thirteenth aspect of the present invention provides a liquid crystal display apparatus, comprising: a liquid crystal layer; a reflector arranged at the back of the liquid crystal layer and at an inclination angle; and a light source arranged at an end of the reflector, the light source emitting light having directivity, wherein the reflector comprises: a plurality of movable reflectors arranged in array, and wherein the plurality of movable reflectors reflect the light emitted by the light source to radiate the reflected light toward the liquid crystal layer.

This configuration enables the one light source to radiate light toward all of the movable reflectors, thereby providing the effective liquid crystal display apparatus. The plurality of movable reflectors may be provided per pixel of the liquid crystal layer.

A fourteenth aspect of the present invention provides a liquid crystal display apparatus as defined in the thirteenth aspect, further comprising: a position detector operable to detect a position of eyes of a user viewing a display image on the liquid crystal layer to generate first position information regarding the eyes, wherein the plurality of movable reflectors adjust rotation angles of the plurality of movable reflectors based on the first position information, thereby adjusting reflection angles of light reflected by the plurality of movable reflectors.

This configuration enables the reflected light to be radiated toward the eyes of the user based on the first position information. Accordingly, favorable visibility to the user can be secured, and simultaneously reflected light is not radiated in useless directions unable to be seen by the user, thereby reducing power consumption all the more. As a result, this configuration enables to provide the liquid crystal display apparatus that can secure favorable visibility and reduce power consumption thereof.

EFFECT OF INVENTION

According to the present invention, it is possible to provide a liquid crystal display apparatus that can secure favorable visibility and reduce power consumption for light-emitting.

DETAILED DESCRIPTION OF THE INVENTION

Next, referring to the attached drawings, Embodiments of the present invention will now be explained.

(Embodiment 1)

Figure 1:
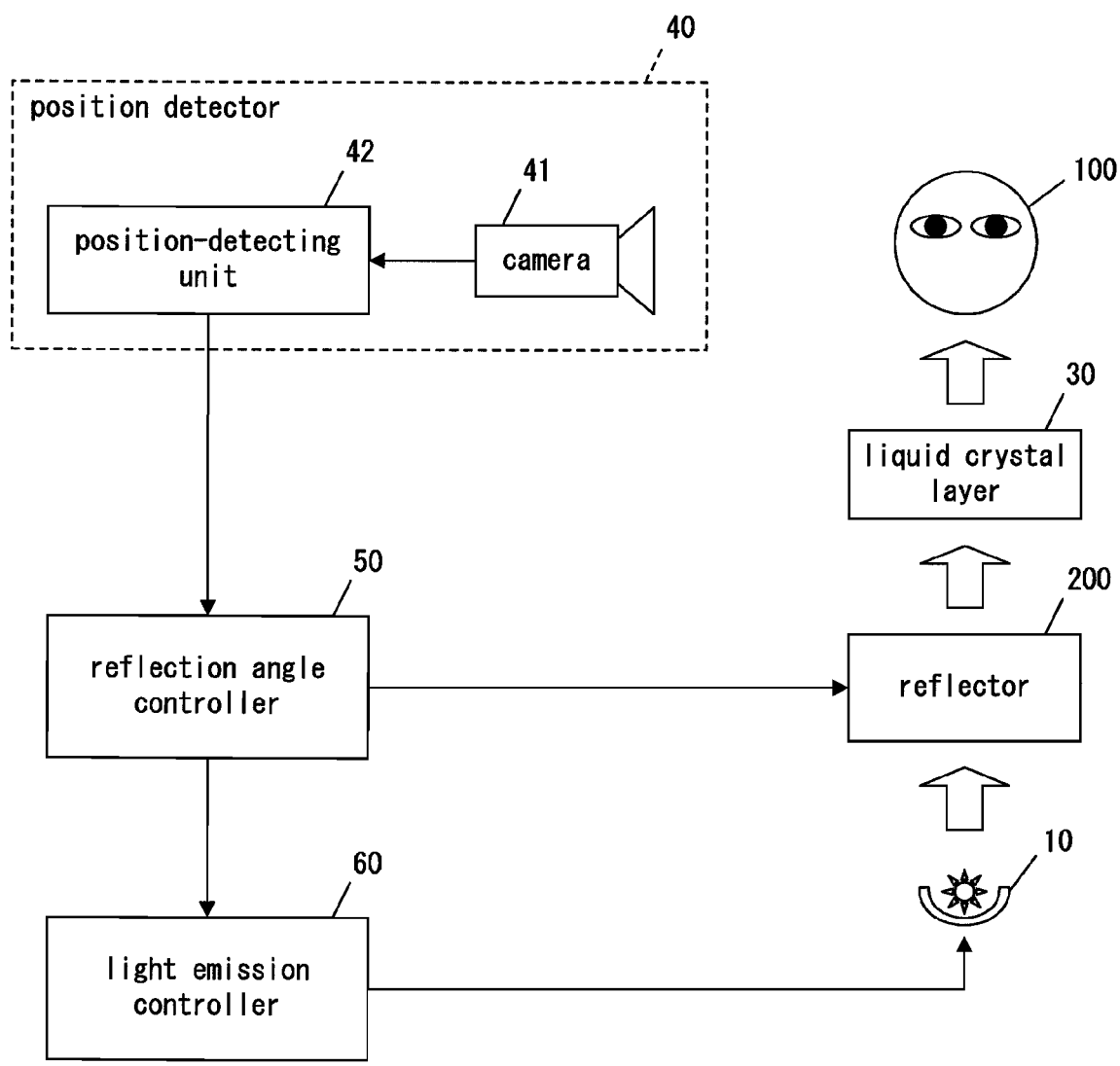
FIG. 1 is a block diagram of a liquid crystal display apparatus in Embodiment 1 of the present invention.

FIG. 1 is a block diagram of a liquid crystal display apparatus in Embodiment 1 of the present invention. The liquid crystal display apparatus of this embodiment comprises: a light source 10 for emitting light having high directivity; a reflector 200 for reflecting the light emitted by the light source 10; a liquid crystal layer 30 that the light reflected by the reflector 200 penetrates; a position detector 40 for detecting a position of eyes of a user 100 viewing a display image on the liquid crystal layer 30 to generate position information (hereinafter, first position information) regarding the position of the eyes; a reflection angle controller 50 for controlling a rotation angle of the reflector 200 based on the first position information, thereby adjusting a reflection angle of light reflected by the reflector 200; and a light emission controller 60 for controlling light intensity and a light-emitting angle of the light source 10 according to the reflection angle of light reflector 200. The position detector 40 includes: a camera 41 for shooting a picture of a face portion of the user 100 viewing the display image on the liquid crystal display apparatus; and a position-detecting unit 42 for detecting the position of eyes of the user 100 from the picture shot by the camera 41 to generate position information (the first position information) regarding the position of eyes.

Figure 2:
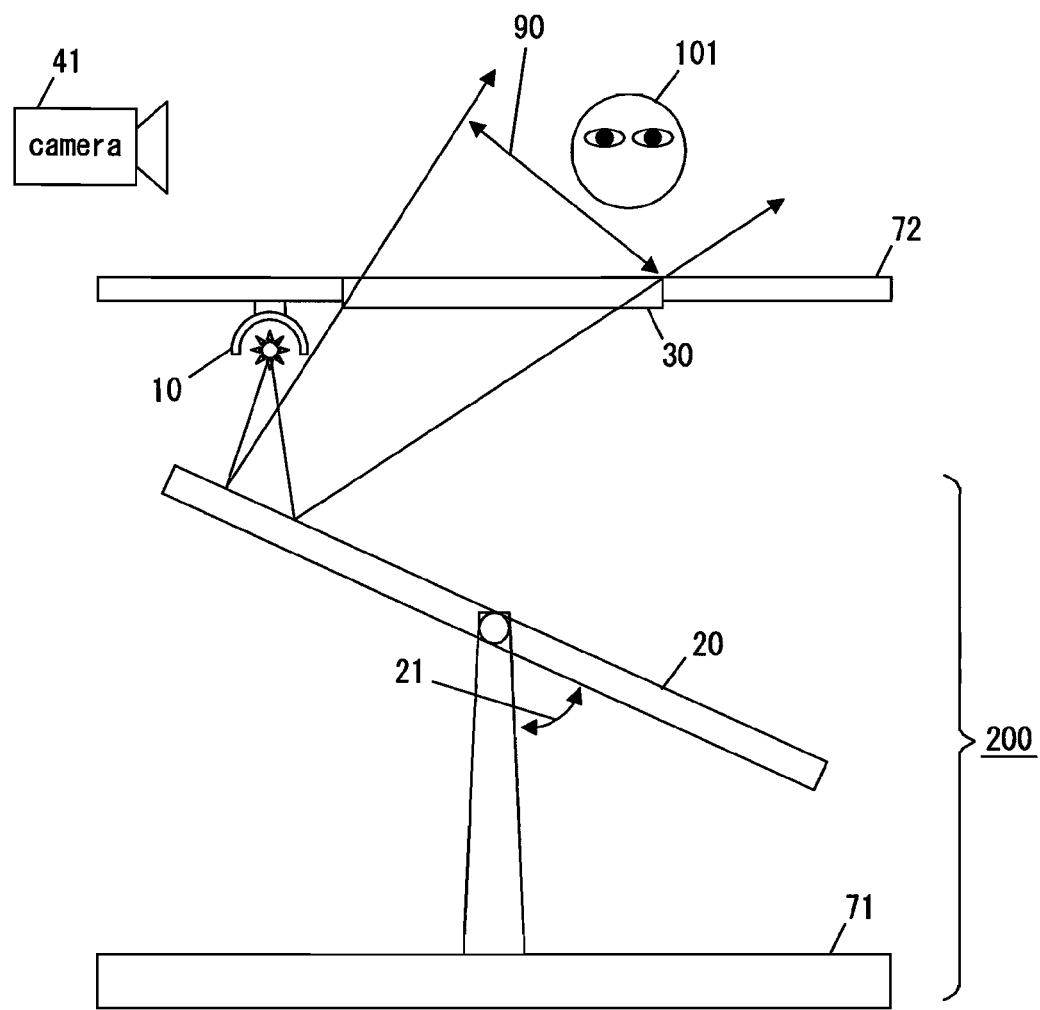
FIG. 2 is a first illustration of the liquid crystal display apparatus in Embodiment 1 of the present invention.
Figure 3:
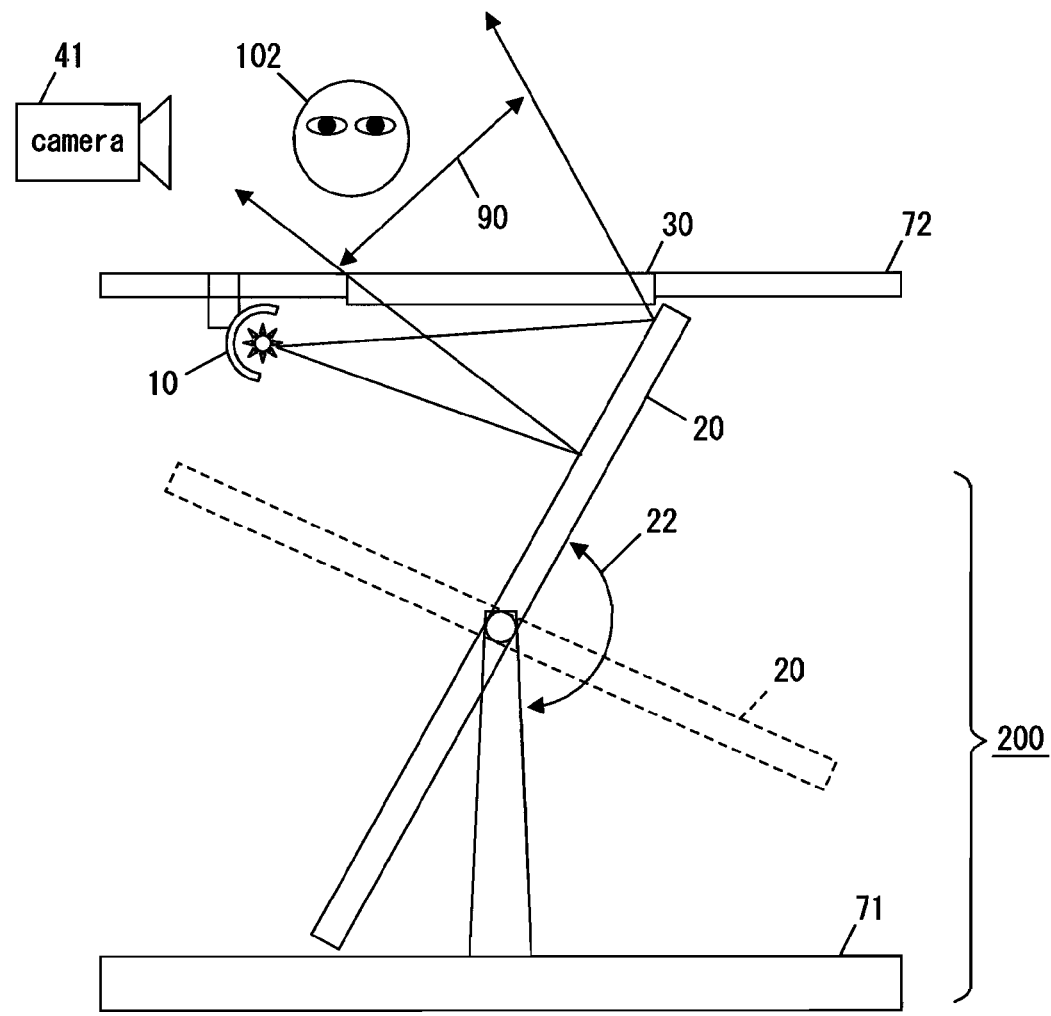
FIG. 3 is a second illustration of the liquid crystal display apparatus in Embodiment 1 of the present invention.

FIG. 2 and FIG. 3 are illustrations of the liquid crystal display apparatus in Embodiment 1 of the present invention.

Referring to FIG. 1 and FIG. 2, operation of the liquid crystal display apparatus in Embodiment 1 of the present invention in a certain state will now be explained. In FIG. 2, the liquid crystal layer 30 and the light source 10 are provided with a base plate 72, and there is a first user 101 being ahead of the liquid crystal layer 30 on the right. A reflector 200 is composed of a base 71 and a reflecting plate 20. The reflector 200 reflects light from the light source 10 at a certain angle (a first angle 21). The reflected light penetrates the liquid crystal layer 30 and reaches toward the first user 101.

In FIG. 2, the camera 41 shoots a picture of a face portion of the first user 101. The position-detecting unit 42 of FIG. 1 detects a position of eyes of the first user 101 from the picture shot by the camera 41 and generates first position information. The reflection angle controller 50 sets the reflecting plate 20 into the first angle 21 based on the first position information generated by the position-detecting unit 42. The light emission controller 60 controls light intensity and a light-emitting angle of the light source 10. As a result, light emitted by the light source 10 is reflected by the reflecting plate 20, effectively penetrates the liquid crystal layer 30, and reaches the first user 101. The first user 101 can view a display screen of the liquid crystal layer 30 comfortably.

Next, referring to FIG. 1 and FIG. 3, operation of the liquid crystal display apparatus in Embodiment 1 of the present invention in another state will now be explained. In FIG. 3, there is a second user 102 being ahead of the liquid crystal layer 30 on the left. The camera 41 shoots a picture of a face portion of the second user 102. The position-detecting unit 42 detects a position of eyes of the second user 102 from the picture shot by the camera 41 and generates first position information. The reflection angle controller 50 sets the reflecting plate 20 into the second angle 22 based on the first position information generated by the position-detecting unit 42. The light emission controller 60 controls light intensity and a light-emitting angle of the light source 10. As a result, light emitted by the light source 10 is reflected by the reflecting plate 20, effectively penetrates the liquid crystal layer 30, and reaches the second user 102. The second user 102 can view the display screen of the liquid crystal layer 30 comfortably.

As explained above, in the liquid crystal display apparatus of this embodiment, the position detector 40 detects the position of eyes of a user to generate the position information (first position information) regarding the position of the eyes. The reflection angle controller 50 controls the rotation angle of the reflecting plate 20 based on the first generated position information. The light emission controller 60 controls the light intensity and the light-emitting angle of the light source 10. The light emitted by the light source 10 effectively reaches toward the eyes of the user. As a result, the user can view the display screen of the liquid crystal display apparatus within a necessary and sufficient range of a view area 90 regardless of his/her position. Simultaneously, the liquid crystal display apparatus of this embodiment can prevent light emitted by the light source 10 from reaching except toward the view area necessary to the user. Unnecessary radiation of light and useless power consumption thereof can be reduced.

Functions of the liquid crystal display apparatus of this embodiment may be extended so that the position detector 40 detects not only the first position information regarding the eyes of the first user 101 but also the distance between the first user 101 and the liquid crystal layer 30 from the picture of the first user 101 shot by the camera 41, thereby generating position information (hereinafter, second position information) regarding the detected distance of the first user 101. In this case, the light emission controller 60 controls the light intensity of the light source 10 according to the distance between the liquid crystal layer 30 and the first user 101 based on the second position information. That is, the light emission controller 60 reduces the light intensity of the light source 10 when the first user 101 is near to the liquid crystal layer 30. The light emission controller 60 increases the light intensity of the light source 10 when the first user 101 is far from the liquid crystal layer 30. As a result, the liquid crystal display apparatus of this embodiment can always provide the first user 101 with the display screen having preferable brightness.

Similarly, the position detector 40 generates the first position information and second position information with respect to the second user 102 shown in FIG. 3. As a result, the liquid crystal display apparatus of this embodiment can also always provide the second user 102 with the display screen having preferable brightness.

(Embodiment 2)

A block diagram of a liquid crystal display apparatus in Embodiment 2 of the present invention is the same as FIG. 1.

Figure 4:
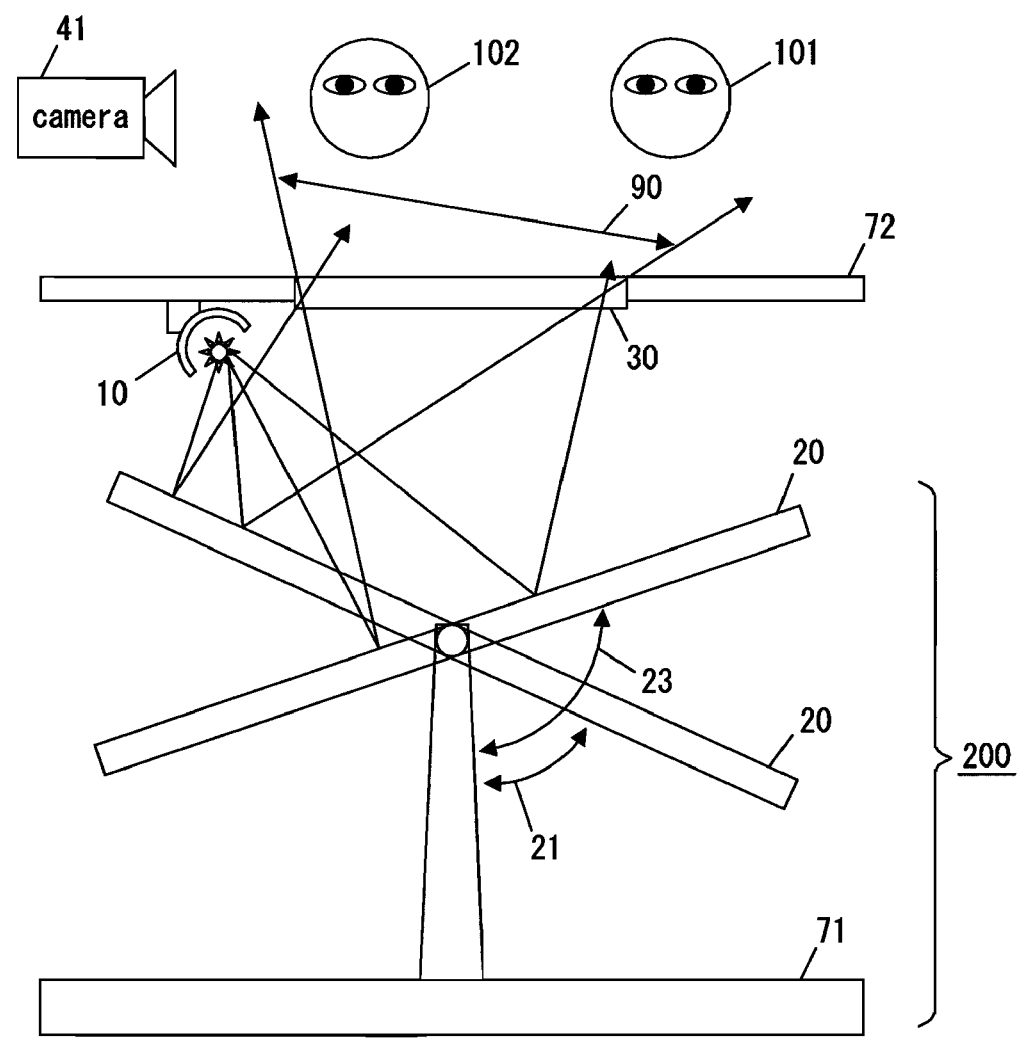
FIG. 4 is an illustration of a liquid crystal display apparatus in Embodiment 2 of the present invention.

FIG. 4 is an illustration of the liquid crystal display apparatus in Embodiment 2 of the present invention. In FIG. 4, explanation is omitted by attaching the same symbols to the same elements as those of FIG. 2.

Referring to FIG. 1 and FIG. 4, operation of the liquid crystal display apparatus in Embodiment 2 of the present invention will now be explained. In the liquid crystal display apparatus of this embodiment illustrated in FIG. 4, the camera 41 shoots pictures of face portions of a first user 101 being ahead of the liquid crystal layer 30 on the right and a second user 102 being ahead of the liquid crystal layer 30 on the central left, respectively. The position-detecting unit 42 detects positions of the eyes of the first user 101 and the second user 102 to generate position information (hereinafter, third position information) regarding the positions of the eyes, respectively. The reflection angle controller 50 makes the reflecting plate 20 periodically oscillate within a range between the first angle 21 and the third angle 23 based on the third position information generated by the position-detecting unit 42. Simultaneously, the light emission controller 60 makes the light-emitting direction and the light intensity of the light source 10 oscillate synchronizing with the oscillation of the reflecting plate 20. As a result, light emitted by the light source 10 is reflected by the reflection plate 20, penetrates the liquid crystal layer 30, and then reaches the first and second users 101 and 102 within a view area 90.

As explained above, the liquid crystal display apparatus of this embodiment can provide the two users in front of the display screen with the favorable view area 90. The light from the light source 10 is not radiated except toward the view area 90, thereby enabling to reduce useless power consumption.

In the above description, it is assumed that there are the two users of the first and second users 101 and 102 in front of the liquid crystal display apparatus of this embodiment. The liquid crystal display apparatus of this embodiment is, however, also available when there are three or more users are in front of it. In this case, it is preferable that the position detector 40 generates the third position information considering a position of eyes of a leftmost user and a position of eyes of a rightmost user. As a result, the reflection angle controller 50 controls the reflecting plate 20 based on the third position information, the light emission controller 60 controls the light source 10. The liquid crystal display apparatus of this embodiment can provide the front three or more users with the favorable view area 90.

(Embodiment 3)

A block diagram of a liquid crystal display apparatus in Embodiment 3 of the present invention is the same as FIG. 1. The light source 10, however, includes two light-emitting elements, and the light emission controller 60 controls these two light-emitting elements.

Figure 5A:
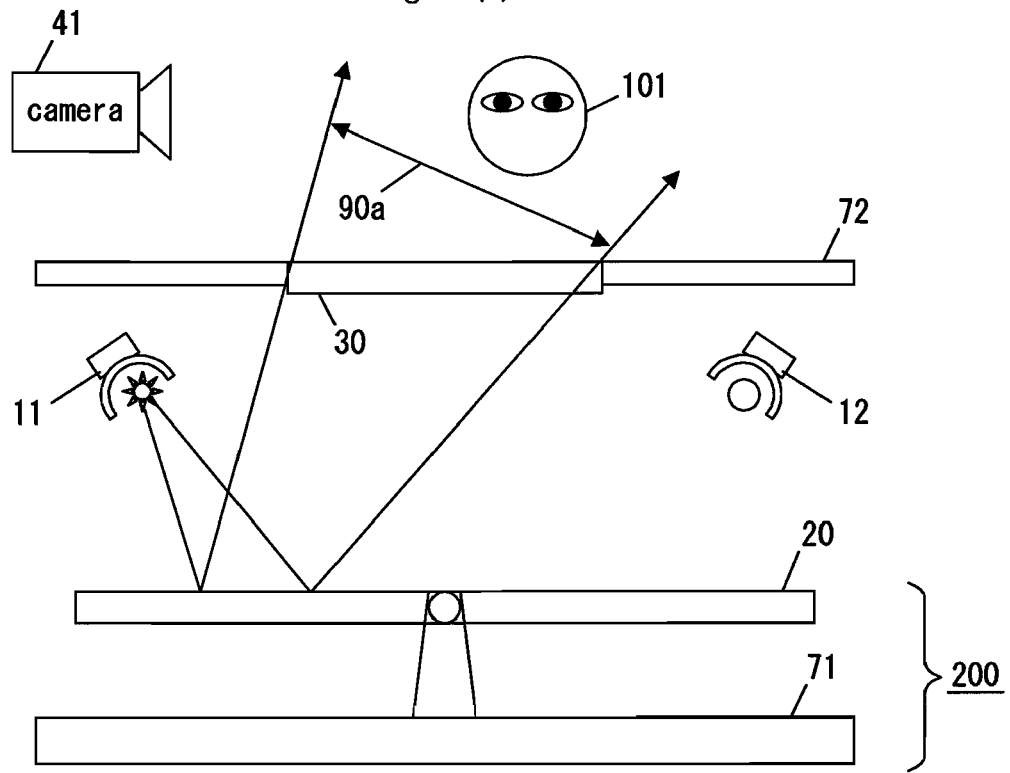
FIG. 5 (*a*) is a first illustration of a liquid crystal display apparatus in Embodiment 3 of the present invention, and FIG. 5 (*b*) is a second illustration of the liquid crystal display apparatus in Embodiment 3 of the present invention.
Figure 5B:
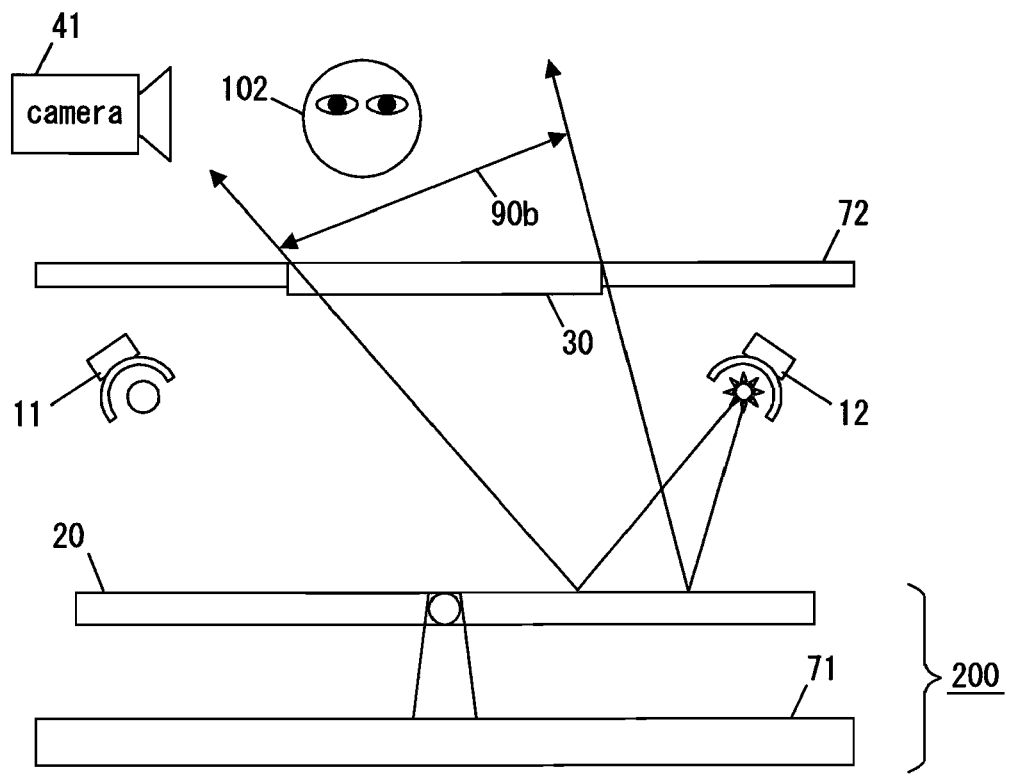

FIG. 5 (*a*) is a first illustration of the liquid crystal display apparatus in Embodiment 3 of the present invention, and FIG. 5 (*b*) is a second illustration of the liquid crystal display apparatus in Embodiment 3 of the present invention. In FIGS. 5 (*a*) and (b), explanation is omitted by attaching the same symbols regarding the same elements as those of FIG. 2.

The light source 10 of this embodiment includes two light-emitting elements, that is, a first light source 11 and a second light source 12.

In FIG. 5(*a*), the camera 41 shoots a picture of a face portion of a first user 101 being ahead of the liquid crystal layer 30 on the right. The position-detecting unit 42 detects a position of the eyes of the first user 101 to generate position information (hereinafter, first position information) regarding the position of the eyes. The reflection angle controller 50 controls a rotation angle of the reflecting plate 20 based on the first position information generated by the position-detecting unit 42, thereby adjusting a reflection angle of light reflected by the reflection plate 20. The light emission controller 60 turns on the first light source 11 and controls light intensity and a light-emitting angle thereof. As a result, the light reflected by the reflecting plate 20 penetrates the liquid crystal layer 30, and then reaches the first user 101 within a range of the view area 90*a*. Simultaneously, the light emission controller 60 turns off the second light source 12.

Next, in FIG. 5 (*b*), the first user 101 being ahead of the liquid crystal layer 30 on the right disappears from sight, and a second user 102 being ahead of the liquid crystal layer 30 on the left is in sight instead. Then, the camera 41 shoots a face portion of the second user 102. The position-detecting unit 42 detects a position of eyes of the second user 102 from the picture shot by the camera 41 to generate new position information (new first position information) regarding the position of the eyes. The reflection angle controller 50 controls a rotation angle of the reflecting plate 20 based on the new first position information generated by the position-detecting unit 42, thereby adjusting a reflection angle of light reflected by the reflection plate 20. The light emission controller 60 turns on the second light source 12, and controls light intensity and a light-emitting angle thereof. As a result, the light reflected by the reflecting plate 20 penetrates the liquid crystal layer 30, and reaches the second user 102 within the range of a view area 90b. Simultaneously, the light emission controller 60 turns off the first light source 11.

When the first user 101 and the second user 102 are at the positions illustrated in FIGS. 5 (a) and 5 (b), respectively and simultaneously, the camera 41 shoots pictures of face portions of the first and second users 101 and 102. The position-detecting unit 42 detects the positions of eyes of the first and second users 101 and 102 to generate position information (third position information) regarding the positions of respective eyes. The reflection angle controller 50 controls the reflecting plate 20 based on this third position information. Simultaneously, the light emission controller 60 turns on the first light source 11 and the second light source 12, and controls each light intensity and light-emitting angle thereof. As a result, it is possible to provide the first and second users 101 and 102 with favorable view areas 90a and 90b, simultaneously. In this case, the reflection angle controller 50 preferably controls so that the reflecting plate 20 is substantially parallel to the liquid crystal layer 30.

In the liquid crystal display apparatus of this embodiment, since the first light source 11 and the second light source 12 are arranged at right and left of the back of the liquid crystal layer 30, it is possible to limit the rotation angle of the reflecting plate 20 to a considerably narrow range comparing with Embodiment 1 of the present invention for the users being ahead of the liquid crystal layer 30 on the left and the right. As a result, it is possible to make the height of the base 71 less, thereby downsizing the liquid crystal display apparatus. The range of rotation angles of the rotate reflecting plate 20 is narrow, thereby contributing to saving power.

(Embodiment 4)

A block diagram of a liquid crystal display apparatus in Embodiment 4 of the present invention is the same as FIG. 1. The reflector 200, however, is composed of a plurality of movable reflectors. The reflection angle controller 50 controls these movable reflectors.

Figure 6:
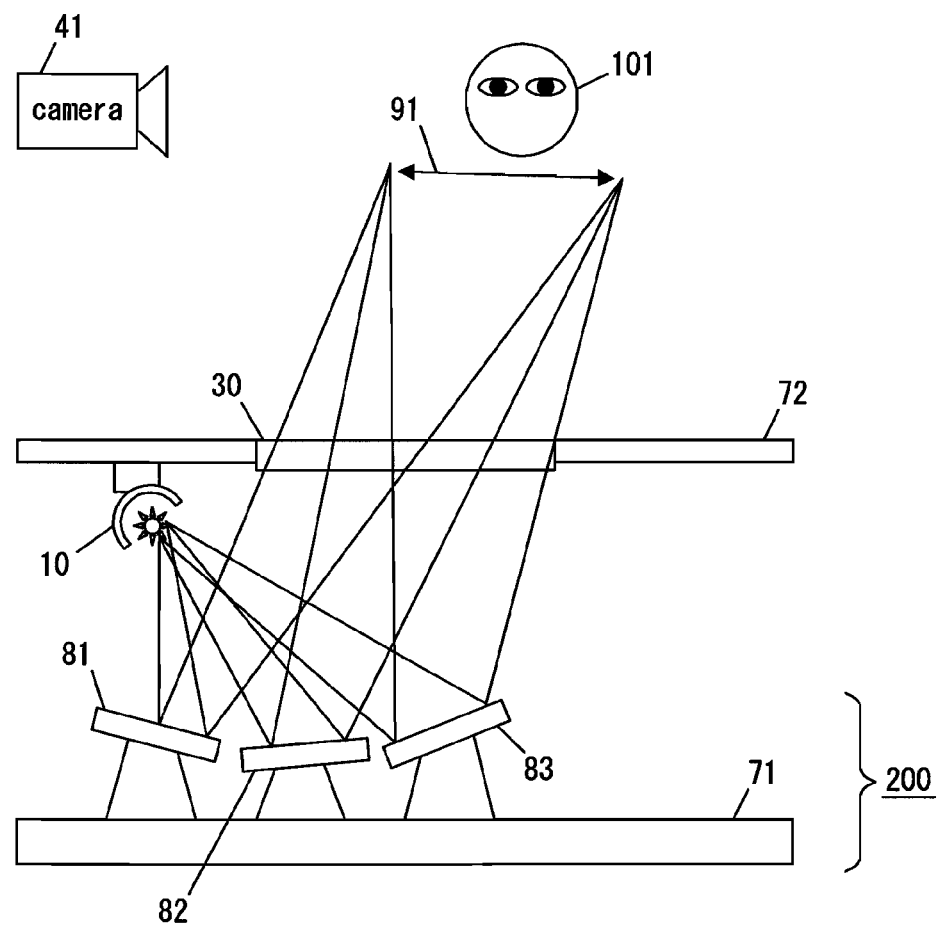
FIG. 6 is an illustration of a liquid crystal display apparatus in Embodiment 4 of the present invention.

FIG. 6 is an illustration of the liquid crystal display apparatus in Embodiment 4 of the present invention. In FIG. 6, explanation is omitted by attaching the same symbols regarding the same elements as those of FIG. 2.

As shown in FIG. 6, a reflector 200 of the liquid crystal display apparatus of this embodiment includes: a base 71; and a plurality of small movable reflectors 81, 82, and 83 attached thereto. The movable reflectors 81, 82, and 83 can change independently the respective reflection angle that light is reflected thereby under control of the light emission controller 60.

In FIG. 6, the camera 41 shoots a picture of a face portion of the first user 101. The position-detecting unit 42 detects a position of eyes of the first user 101 from the picture shot by the camera 41 to generate position information (first position information) regarding the position of the eyes. The reflection angle controller 50 controls reflection angles of light reflected by the movable reflectors 81, 82 and 83 based on the first position information generated by the position-detecting unit 42, respectively and independently. The light emission controller 60 controls light intensity and a light-emitting angle of the light source 10.

As shown in FIG. 6, the light reflected by the movable reflector 81 penetrates a part of the liquid crystal layer 30, and reaches the first user 101. The light reflected by the movable reflector 82 penetrates another part of the liquid crystal layer 30, and reaches the first user 101. The light reflected by the movable reflector 83 penetrates the other part of the liquid crystal layer 30, and reaches the first user 101. As a result, the first user 101 is provided with a view area 91 enabling to view the whole liquid crystal layer 30.

Herein, the light source 10 may emit light with the radiation angle for radiating all of the movable reflectors 81-83 at once. Otherwise, the light source 10 may emit light with narrower radiation angles, each of which the light source 10 cyclicality radiates the movable reflectors 81, 82 and 83.

Similar to Embodiment 1 of the present invention, the liquid crystal display apparatus of this embodiment can control the emission area of the light source 10 so that the necessary and sufficient view area is secured to the user, thereby reducing useless emission and contributing to power saving.

(Embodiment 5)

A block diagram of a liquid crystal display apparatus in Embodiment 5 of the present invention is the same as FIG. 1. The liquid crystal layer 30, however, is composed of a plurality of liquid crystal layers horizontally arranged.

Figure 7:
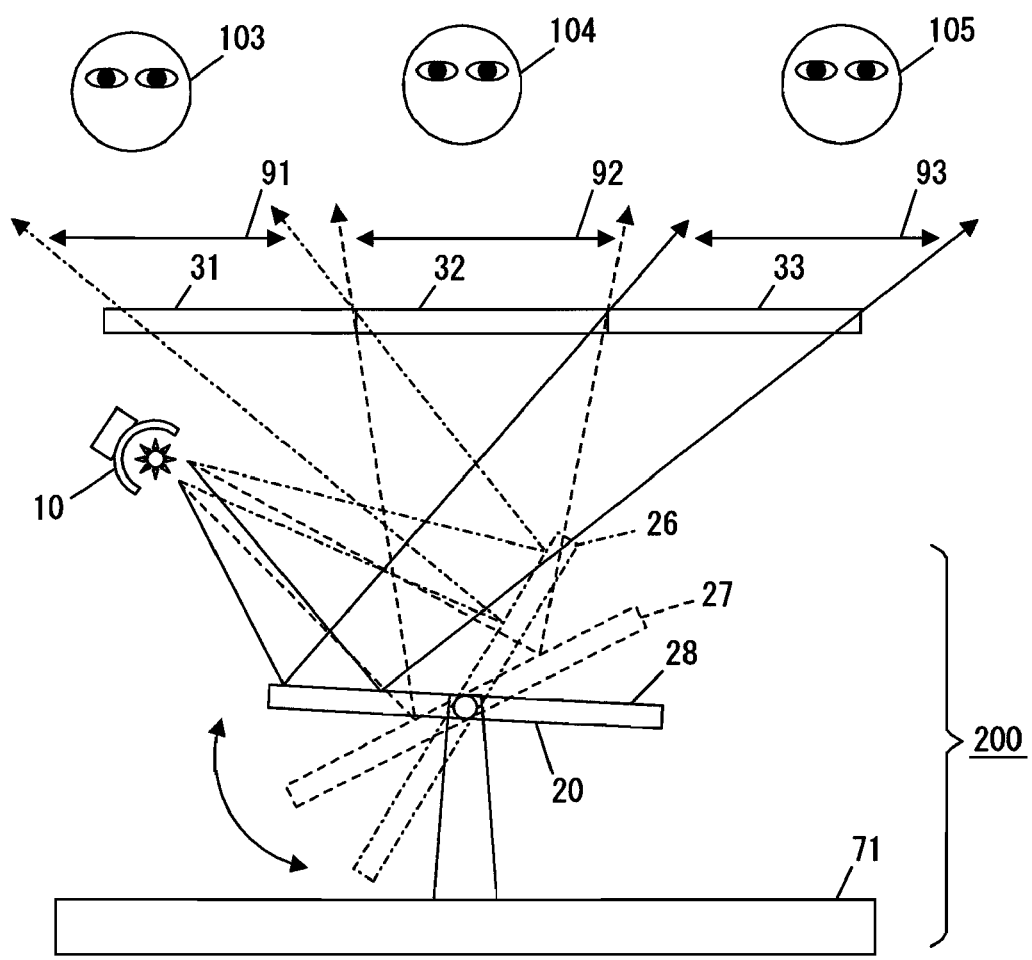
FIG. 7 is an illustration of a liquid crystal display apparatus in Embodiment 5 of the present invention.

FIG. 7 is an illustration of the liquid crystal display apparatus in Embodiment 5 of the present invention. In FIG. 7, explanation is omitted by attaching the same symbols regarding the same elements as those of FIG. 2.

As shown in FIG. 7, the liquid crystal layer 30 of the liquid crystal display apparatus of this embodiment is composed of a liquid crystal layer A31, a liquid crystal layer B32, and a liquid crystal layer C33, which are horizontally arranged. The liquid crystal layers A31, B32, and C33 display pictures differing from each other.

The light from the light source 10 is reflected by the reflecting plate 20, penetrates the liquid crystal layer A31, and reaches a user A103 through a view area A91 shown with dashed lines when the reflecting plate 20 is in the position of an angle A26.

The light from the light source 10 is reflected by the reflecting plate 20, penetrates the liquid crystal layer B32, and reaches a user B104 through a view area B92 shown with broken lines when the reflecting plate 20 is in the position of an angle B27.

The light from the light source 10 is reflected by the reflecting plate 20, penetrates the liquid crystal layer C33, and reaches a user C105 through a view area C93 shown with solid lines when the reflecting plate 20 is in the position of an angle C28.

The light source 10 changes light intensity and a light-emitting angle thereof under control of the light emission controller 60 with change the position of the reflecting plate 20.

This configuration of the liquid crystal display apparatus of this embodiment enables to change the position of the reflecting plate 20 into the angles A26, B27, and C28, thereby displaying display images differing from each other to the users A103, B104, and C105.

For example, it is assumed that the camera 41 shoots a face portion of a person, who is moving in front of the liquid crystal display viewing it from the left to the right, and further that the position-detecting unit 42 detects the position of this person's eyes to generate the first position information as shown in FIG. 1. The reflection angle controller 50 controls a rotation angle of the reflecting plate 20 based on the first position information generated by the position-detecting unit 42, thereby adjusting the reflection of light reflected by the reflecting plate 20. The light emission controller 60 controls light intensity and a light-emitting angle of the light source 10 synchronizing with the rotation angle of the reflecting plate 20. In such an example, a display screen of the liquid crystal layer A31 is displayed when the person comes to the position of the user A103. A display screen of the liquid crystal layer B32 is displayed when the person comes to the position of the user B104. A display screen of the liquid crystal layer C33 is displayed when the person comes to the position of the user C105.

As explained above, the liquid crystal display apparatus of this embodiment can provide display images differing according to positions and angles in which the user views. In the liquid crystal display apparatus of this embodiment, it is enough for the light source 10 to radiate light only within a certain limited range toward the user, thereby preventing from radiating useless light. Accordingly, the liquid crystal display apparatus for saving power thereof can be realized.
(Embodiment 6)

Figure 8A:
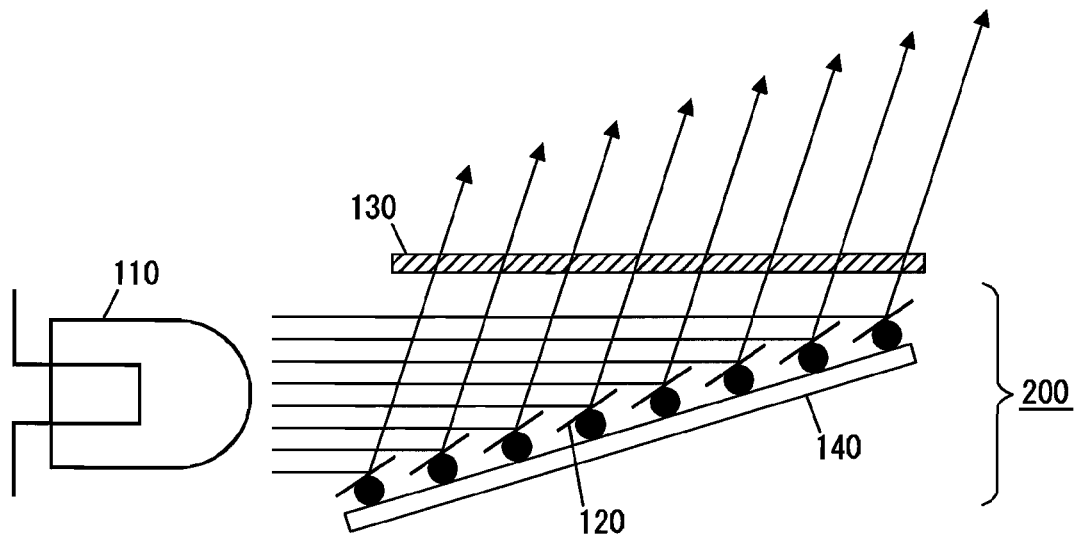
FIG. 8 (*a*) illustrates a configuration of a liquid crystal display apparatus in Embodiment 6 of the present invention, and FIG. 8 (*b*) illustrates a configuration of the liquid crystal display apparatus in Embodiment 6 of the present invention.
Figure 8B:
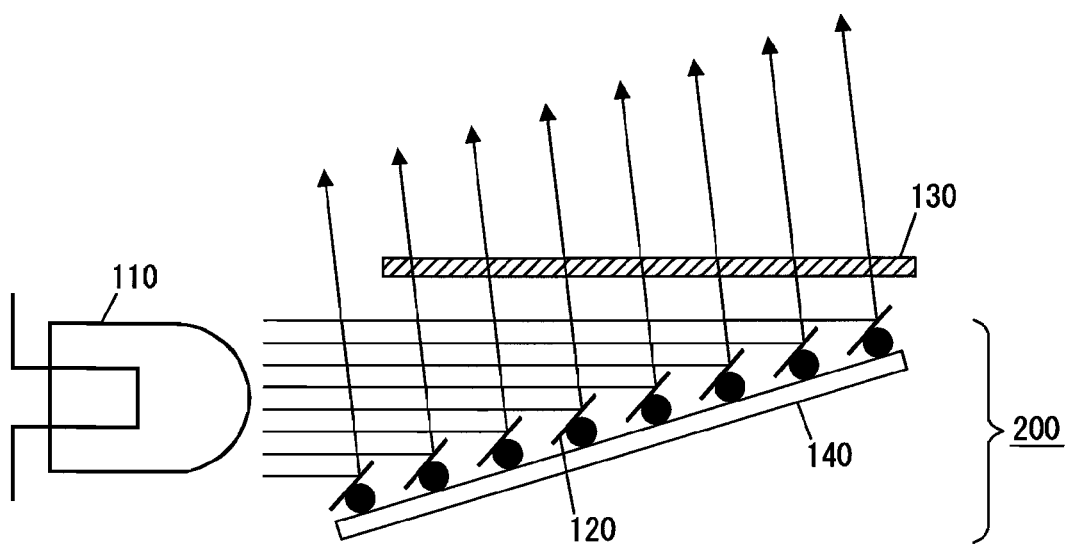

FIGS. 8 (a) and 8 (b) illustrate a configuration of a liquid crystal display apparatus in Embodiment 6 of the present invention. The liquid crystal display apparatus of this embodiment includes: a liquid crystal layer 130; a base plate 140 arranged having an angle of inclination at the back of the liquid crystal layer 130; a plurality of movable reflectors 120 arranged in array on the base plate 140; and a light source 110 for emitting almost parallel light beam towards the plurality of movable reflectors 120. The plurality of movable reflectors 120 are made small.

The liquid crystal display apparatus of this embodiment can be used combining with the position detector 40, the reflection angle controller 50, and the light emission controller 60 of Embodiment 1 of the present invention shown in FIG. 1. In this case similar to Embodiment 1 of the present invention, the reflection angle controller 50 controls the rotation angles of the plurality of movable reflectors 120 based on position information (first position information) generated by the position detector 40 regarding the position of eyes of a user, thereby directing the reflected light toward the eyes of the user. The light emission controller 60 controls light intensity of the light source 110 according to the rotation angles of the movable reflectors 120.

The small movable reflectors 120 for this configuration can be provided by making small mirrors manufactured with fine processing technology for semiconductors, which is called MEMS (Micro Electro-Mechanical System), and making them operate according to electromagnetic action.

Figure 9A:
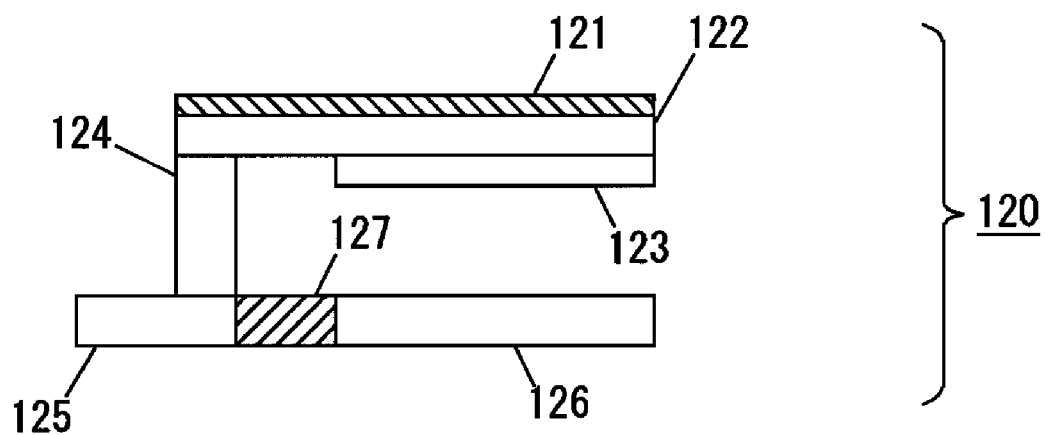
FIG. 9 (*a*) illustrates a configuration of a small movable reflector in Embodiment 6 of the present invention, and FIG. 9 (*b*) illustrates a configuration of the small movable reflector in Embodiment 6 of the present invention when voltage is applied.
Figure 9B:
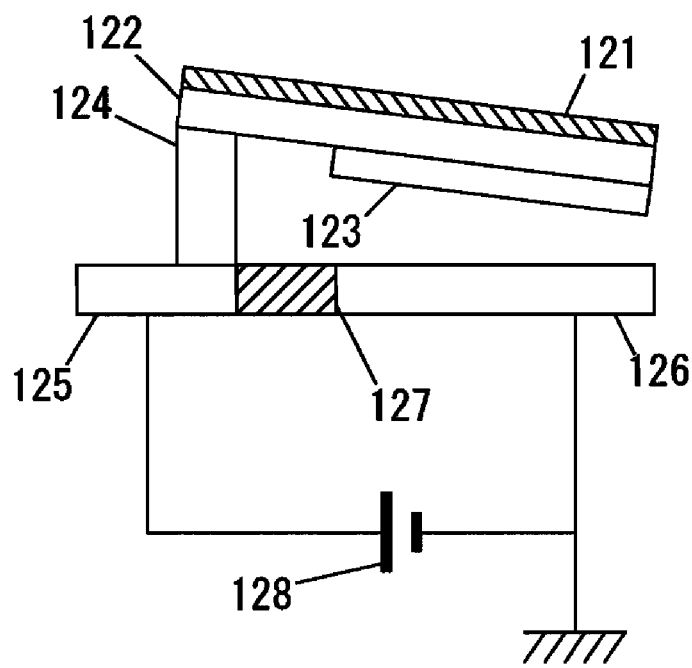

FIG. 9 (a) illustrates a configuration of one of the small movable reflectors in Embodiment 6 of the present invention. As shown in FIG. 9 (a), each of the small movable reflectors 120 of this embodiment includes: a B member 125 and a B conductor layer 126 which constitute a base; an insulating layer 127 sandwiched there-between; a column 124 attached on an upper surface of the B member 125; an A member 122 having an end supported by the column 124; a reflector 121 fixed on an upper surface of the A member 122; and an A conductor layer 123 fixed on a lower surface of the A member 112 facing to the B conductor layer 126. The A member 122, the A conductor layer 123, the column 124, and the B member 125 have conductivity, and are kept having the same electric potential.

FIG. 9 (b) illustrates a configuration of one of the small movable reflectors in Embodiment 6 of the present invention when voltage is applied. As shown in FIG. 9 (b), an open end of the A member 122 approaches the B conductor layer 126 according to electromagnetic action when the voltage is applied between the A conductor layer 123 and the B conductor layer 126. As shown in FIG. 9 (a), force is not exerted between the A conductor layer 123 and the B conductor layer 126 when the voltage is not applied between the B member 125 and the B conductor layer 126. Accordingly, the A member 122 is almost in parallel to the B conductor layer 126.

Next, as shown in FIG. 9 (b), suction is exerted between the A conductor layer 123 and the B conductor layer 126 when the voltage is applied between the B member 125 and the B conductor layer 126. Accordingly, the open end of the A member 122 approaches the B conductor layer 126 so that the A member 122 rotates around a point of contact with the column 124. As a result, the reflector 121 fixed on the upper surface of the A member 122 rotates. The rotation angle of the reflector 121 is controllable by the voltage of a voltage source 128.

In the liquid crystal display apparatus of this embodiment, the reflector 200 is constituted arranging the above-mentioned plurality of small movable reflectors 120 in array on the base plate 140. In FIG. 8 (a), rotation angles of the movable reflectors 120 are set up so that reflected light by the movable reflectors 120 penetrates the liquid crystal layer 130 to be radiated ahead of the liquid crystal layer 130 on the right. In FIG. 8 (b), rotation angles of the movable reflectors 120 is set up so that reflected light by the movable reflectors 120 penetrates the liquid crystal layer 130 to be radiated ahead of the liquid crystal layer 130 on the left.

Thus, according to the liquid crystal display apparatus of this embodiment, an almost parallel light beam emitted by the light source 110 can be reflected by the movable reflectors 120 in the arbitrary directions, thereby making it penetrate the liquid crystal layer 130.

As discussed above, the liquid crystal display apparatus of this embodiment can be used combining with the position detector 40, the reflection angle controller 50, and the light emission controller 60 of Embodiment 1 of the present invention.
(Embodiment 7)

Figure 10:
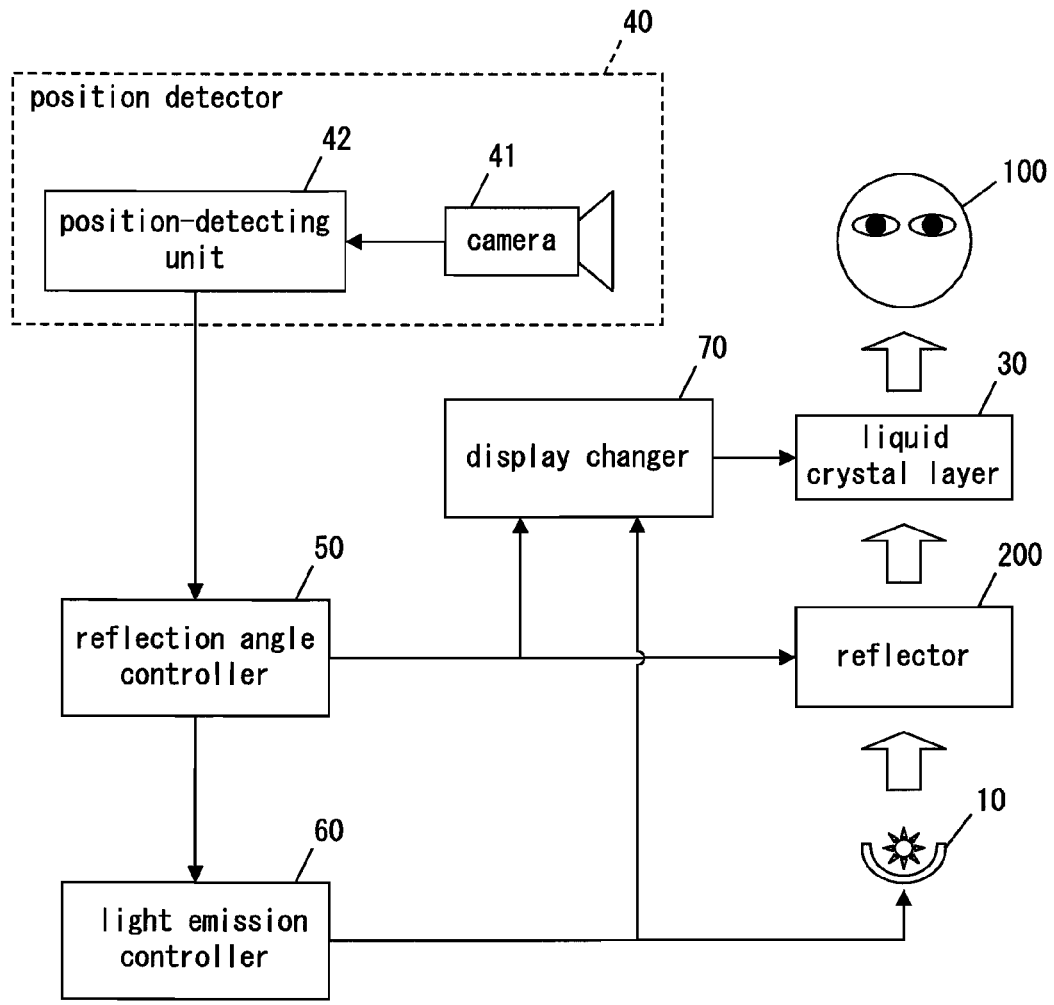
FIG. 10 is a block diagram of a liquid crystal display apparatus in Embodiment 7 of the present invention.
Figure 11:
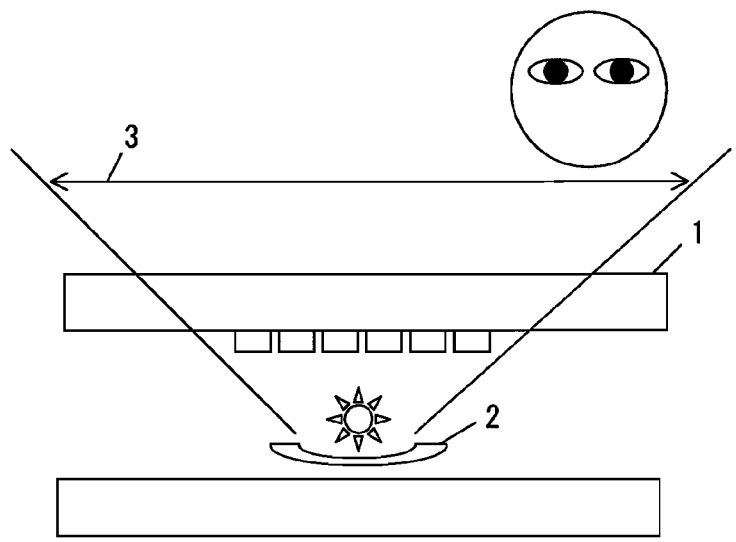
FIG. 11 illustrates a configuration of a conventional liquid crystal display apparatus using backlight.
Figure 12:
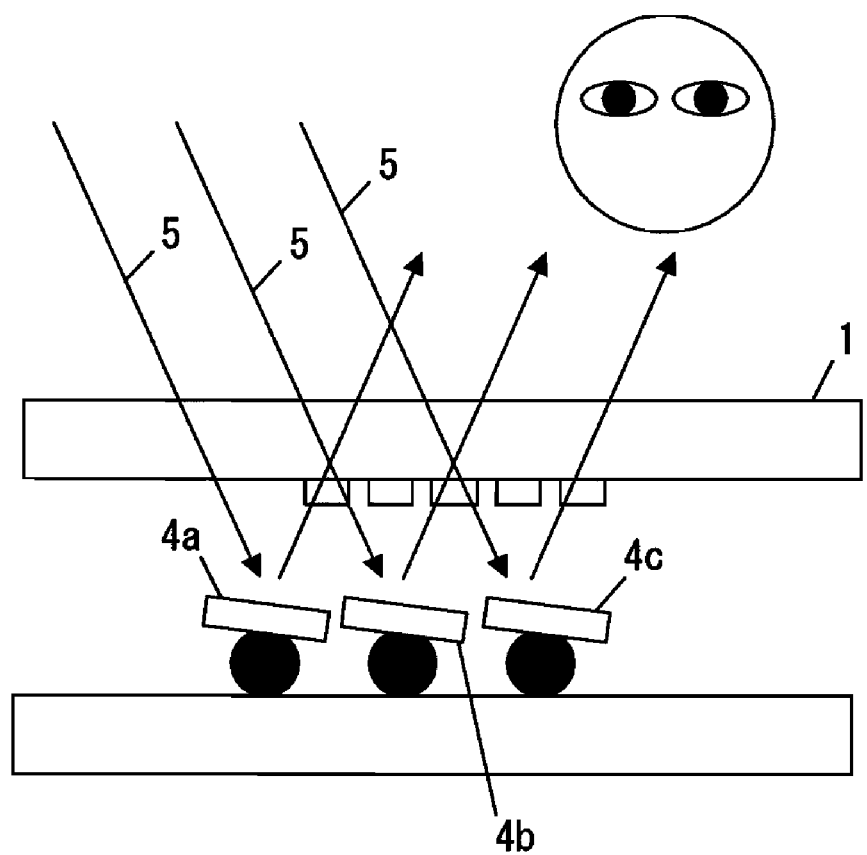
FIG. 12 illustrates a configuration of a conventional reflective liquid crystal device capable of controlling a visual angle thereof.

FIG. 10 is a block diagram of a liquid crystal display apparatus in Embodiment 7 of the present invention. In FIG. 10, explanation is omitted by attaching the same symbols regarding the same elements as those of FIG. 1.

In addition to the liquid crystal display apparatus in Embodiment 1 of the present invention, the liquid crystal display apparatus of this embodiment shown in FIG. 1 further includes: a display changer 70 for changing a display screen of the liquid crystal layer 30.

In the liquid crystal display apparatus of this embodiment, the position detector 40 detects a position of eyes of a user 100 viewing a display image on the liquid crystal layer 30 to generate position information (first position information) regarding the position of the eyes. The reflection angle controller 50 controls a rotation angle of a reflector 200 based on the first position information, thereby adjusting the reflection angle of light reflected by the reflector 200. The light emission controller 60 controls light intensity and a light-emitting angle of the light source 10 according to the reflection angle of light reflected by the reflector 200. The above is the same as that of the liquid crystal display apparatus in Embodiment 1 of the present invention shown in FIG. 1.

The display changer 70, which has been newly added in the liquid crystal display apparatus of this embodiment, changes a display screen of the liquid crystal layer 30 synchronizing with the control of a rotation angle of the reflector 200 by the reflection angle controller 50, and/or with the control of emission of the light source 10 by the light emission controller 60. Two typical examples of this embodiment will now be explained below.

In the first example, the display changer 70 changes a display screen of the liquid crystal layer 30 synchronizing with the control of the rotation angle of reflector 200 by the reflection angle controller 50. Referring to FIG. 2 and FIG. 3, the first example will now be explained.

As shown in FIG. 2, the reflection angle controller 50 sets the rotation angle of the reflecting plate 20 to a first angle 21 according to the first position information generated by the position detector 40, and the light emission controller 60 controls light intensity and a light-emitting angle of the light source 10 when a first user 101 is ahead of the liquid crystal layer 30 on the right. As a result, the light reflected by the reflecting plate 20 penetrates the liquid crystal layer 30, and reaches the first user 101. In this case, the display changer 70 changes a screen displayed by the liquid crystal layer 30 into a the first display screen synchronizing with the reflection angle controller 50 setting the rotation angle of the reflecting plate 20 to the first angle 21. As a result, the first user 101 views the first display screen.

Next, as shown in FIG. 3, the reflection angle controller 50 sets the rotation angle of the reflecting plate 20 into the second angle 22 according to the new first position information, and the light emission controller 60 controls light intensity and a light-emitting angle of the light source 10 when the second user 102 is ahead of the liquid crystal layer 30 on the left. As a result, the light reflected by the reflecting plate 20 penetrates the liquid crystal layer 30, and reaches the second user 102. In this case, the display changer 70 changes a screen of the liquid crystal layer 30 into a second display screen synchronizing with the reflection angle controller 50 setting the rotation angle of the reflecting plate 20 into the second angle 22. As a result, the second user 102 views the second display screen.

Thus, in the first example, the display changer 70 changes the display screen of the liquid crystal layer 30 synchronizing with changing the rotation angle of the reflecting plate 20. As a result, the liquid crystal display apparatus of this embodiment can provide display screens differing according to positions of the user to the liquid crystal layer 30.

For example, a preferable method for the display changer 70 synchronizing with changing the rotation angle of the reflecting plate 20 is as follows: the display changer 70 changes a display screen into the first display screen when the rotation angle is within a range of 0-90 degrees; the display changer 70 changes it into the second display screen when the rotation angle is within a range of 90-120 degrees; and the display changer 70 changes it into the third display screen when the rotation angle is within a range of 120-180 degrees.

In the second example, the light source 10 is composed of a plurality of light-emitting elements. The display changer 70 changes a display screen of the liquid crystal layer 30 synchronizing with the control (turning on/off) of light intensity of the plurality of light-emitting elements by the light emission controller 60. Referring to FIG. 5, the second example will now be explained.

As shown in FIG. 5 (a), the light emission controller 60 turns on the first light source 11 to control the light-emitting angle thereof according to the first position information generated by the position detector 40, and the reflection angle controller 50 controls the rotation angle of the reflecting plate 20 when a first user 101 is ahead of the liquid crystal layer 30 on the right. As a result, the light reflected by the reflecting plate 20 penetrates the liquid crystal layer 30, and reaches the first user 101. In this case, the display changer 70 changes the screen displayed by the liquid crystal layer 30 into a first display screen synchronizing with the light emission controller 60 setting to turn on the first light source 11. As a result, the first user 101 views the first display screen.

Next, as shown in FIG. 5 (b), the light emission controller 60 turns on the second light source 12 to control the light-emitting angle thereof according to the first position information generated by the position detector 40, and the reflection angle controller 50 controls the rotation angle of the reflecting plate 20 when a second user 102 is ahead of the liquid crystal layer 30 on the left. As a result, the light reflected by the reflecting plate 20 penetrates the liquid crystal layer 30, and reaches the second user 102. In this case, the display changer 70 changes the screen of the liquid crystal layer 30 into a second display screen synchronizing with the light emission controller 60 turning on the second light source 12. As a result, the second user 102 views the second display screen.

Thus, in the second example, the display changer 70 changes the display screen of the liquid crystal layer 30 synchronizing with the light emission controller 60 turning on the light-emitting element. As a result, the liquid crystal display apparatus of this embodiment can provide display screens differing according to positions of the user to the liquid crystal layer 30.

When the light source 10 includes further more light-emitting elements, the display changer 7 may change display screens one-on-one, and may divide the light-emitting elements into some groups thereof to change display screens for every group.

A light source (See, the light source 10 of FIG. 2) provided with a reflector having a paraboloidal surface, a light source including a lens, and a light source of a semiconductor laser can be used as the light source for emitting light having high directivity according to the present invention.

In the present invention, the position-detecting unit 42 of the position detector 40 shown in FIG. 1 calculates correlation of a face portion picture of the user shot by the camera 41 with a prepared human face pattern picture, searches a position having high correlation, and detects a position of eyes of the user. Another position detector may be used to measure skin temperature of the user with an infrared camera, thereby detecting the position of eyes of the user according temperature distribution thereof. The position of the user may be detected with a transmitter for generating ultrasonic pulses and three ultrasonic sensors for receiving reflected waves of the ultrasonic pulses to measure time lag for the reflected waves to reach the ultrasonic sensors.

The liquid crystal display apparatus according to the present invention can be used in a field of information terminal devices having a liquid crystal display screen, such as cell phones, personal computers, and display devices, and fields related thereto.

The invention claimed is:

1. A liquid crystal display apparatus, comprising:
    a light source operable to emit light having directivity;
    a reflector operable to reflect the light emitted by the light source;
    a liquid crystal layer that the light reflected by the reflector penetrates;
    a position detector operable to detect a position of eyes of a user viewing a display image on the liquid crystal layer to generate first position information regarding the eyes; and
    a reflection angle controller operable to control a rotation angle of the reflector based on the first position information, thereby limiting a reflection angle of the light reflected by the reflector.

2. A liquid crystal display apparatus as defined in claim 1, wherein the reflection angle controller controls the reflection angle of the reflector so as to periodically oscillate within a fixed range based on the first position information.

3. A liquid crystal display apparatus as defined in claim 1, further comprising:
    a light emission controller operable to control at least one of light intensity and a light-emitting angle of the light source according to the rotation angle of the reflector.

4. A liquid crystal display apparatus as defined in claim 3, wherein the light source comprises a plurality of light-emitting elements, and
wherein the emission controller adjusts at least one of light intensity and a light-emitting angle of each of the plurality of light-emitting elements based on the first position information.

5. A liquid crystal display apparatus as defined in claim 4, wherein the light emission controller turns on one part of the plurality of light-emitting elements and turns off another part of the plurality of light-emitting elements based on the first position information.

6. A liquid crystal display apparatus as defined in claim 3, wherein the position detector detects a distance between the user and the liquid crystal layer to generate second position information regarding the detected distance, and
wherein the light emission controller adjusts the light intensity of the light source based on the second position information.

7. A liquid crystal display apparatus as defined in claim 3, wherein the position detector detects positions of eyes of a plurality of users viewing the display screen of the liquid crystal layer to generate third position information regarding the positions of eyes of the plurality of users,
wherein the reflect angle controller controls the rotation angle of the reflector based on the third position information, thereby adjusting a reflection angle of light reflected by the reflector, and
wherein the light emission controller controls at least one of the light intensity and the light-emitting angle of the light source, thereby making light that has penetrated the liquid crystal layer reach each of the plurality of users.

8. A liquid crystal display apparatus as defined in claim 1, wherein the reflection angle controller makes the rotation angle of the reflector oscillate within a fixed range,
wherein the light reflected by the reflector penetrates a part of the liquid crystal layer, the part differing according to the rotation angle of the reflector, and
wherein the liquid crystal layer displays display images that differ according to a position and an angle of the user viewing the display images on the liquid crystal layer.

9. A liquid crystal display apparatus as defined in claim 1, wherein the liquid crystal layer changes the display image synchronizing with the rotation angle of the reflector, thereby displaying display images that differ according to a position and an angle of the user viewing the display images on the liquid crystal layer.

10. A liquid crystal display apparatus as defined in claim 3, wherein the light source comprises a plurality of light-emitting elements,
wherein the light emission controller turns on one among the plurality of light-emitting elements and turns off another among the plurality of light-emitting elements, and
wherein the liquid crystal layer changes the display image synchronizing with turning on a corresponding light-emitting element of the plurality of light-emitting elements, thereby displaying display images that differ according to a position and an angle of the user viewing the display images on the liquid crystal layer.

11. A liquid crystal display apparatus as defined in claim 1, wherein the reflector comprises a plurality of movable reflectors, and
wherein the reflection angle controller controls rotation angles of the plurality of movable reflectors based on the first position information, thereby adjusting reflection angles of light reflected by the plurality of movable reflectors.

12. A liquid crystal display apparatus as defined in claim 11, wherein the light reflected by the plurality of movable reflectors penetrates a part of the liquid crystal layer, the part differing from one to another of the plurality of movable reflectors, and
wherein the liquid crystal layer displays display images that differ according to a position and an angle of the user viewing the display images on the liquid crystal layer.

13. A liquid crystal display apparatus, comprising:
a liquid crystal layer;
a reflector arranged at the back of the liquid crystal layer and at an inclination angle; and
a light source arranged at an end of the reflector, the light source emitting light having directivity;
wherein the reflector comprises a plurality of movable reflectors arranged in array, and
the plurality of movable reflectors reflect the light emitted by the light source to radiate the reflected light toward the liquid crystal layer, and
wherein the plurality of movable reflectors adjusts rotation angles of the plurality of movable reflectors based on first position information regarding a position of eyes of a user viewing a display image on the liquid crystal layer, thereby limiting reflection angles of light reflected by the plurality of movable reflectors.

14. A liquid crystal display apparatus as defined in claim 13, further comprising a position detector operable to detect the position of eyes of the user viewing the display image on the liquid crystal layer to generate the first position information regarding the eyes.

15. A liquid crystal display apparatus as defined in claim 14, wherein the plurality of movable reflectors make reflection angles thereof periodically oscillate within a fixed range based on the first position information.

16. A liquid crystal display apparatus as defined in claim 15, wherein the light source adjusts light intensity thereof according to reflection angles of the plurality of movable reflectors that oscillate periodically.

17. A liquid crystal display apparatus as defined in claim 14, wherein the position detector detects a distance between the user and the liquid crystal layer to generate second position information regarding the detected distance, and
wherein the light source adjusts the light intensity based on the second position information.

18. A liquid crystal display apparatus as defined in claim 14, wherein the position detector detects positions of eyes of a plurality of users viewing the display screen of the liquid crystal layer to generate third position information regarding the positions of eyes of the plurality of users, and
wherein the plurality of movable reflectors adjusts rotation angles of the plurality of movable reflectors based on the third position information, thereby making light reflected by the plurality of movable reflectors penetrate the liquid crystal layer and reach each of the plurality of users.

19. A liquid crystal display apparatus, comprising:
a light source operable to emit light having directivity;
a reflector operable to reflect the light emitted by the light source;
a liquid crystal layer that the light reflected by the reflector penetrates; and
a reflection angle controller operable to control a rotation angle of the reflector based on a detected position of eyes of a user viewing a display image on the liquid crystal layer, thereby limiting a reflection angle of the light reflected by the reflector.

20. A liquid crystal display apparatus, comprising:
a light source operable to emit light having directivity;
a reflector operable to reflect the light emitted by the light source, the light having the directivity;
a liquid crystal layer that the light reflected by the reflector penetrates, the light having the directivity;
a position detector operable to detect a position of eyes of a user; and
a reflection angle controller operable to control, based on the detected position of the eyes, a rotation angle of the light reflected by the reflector, thereby limiting a range that the user can see the light that has penetrated the liquid crystal layer, the light having the directivity.

* * * * *